Nov. 30, 1937. M. A. SLOTTA 2,100,724
SCREW THREADING DIE
Filed June 6, 1936
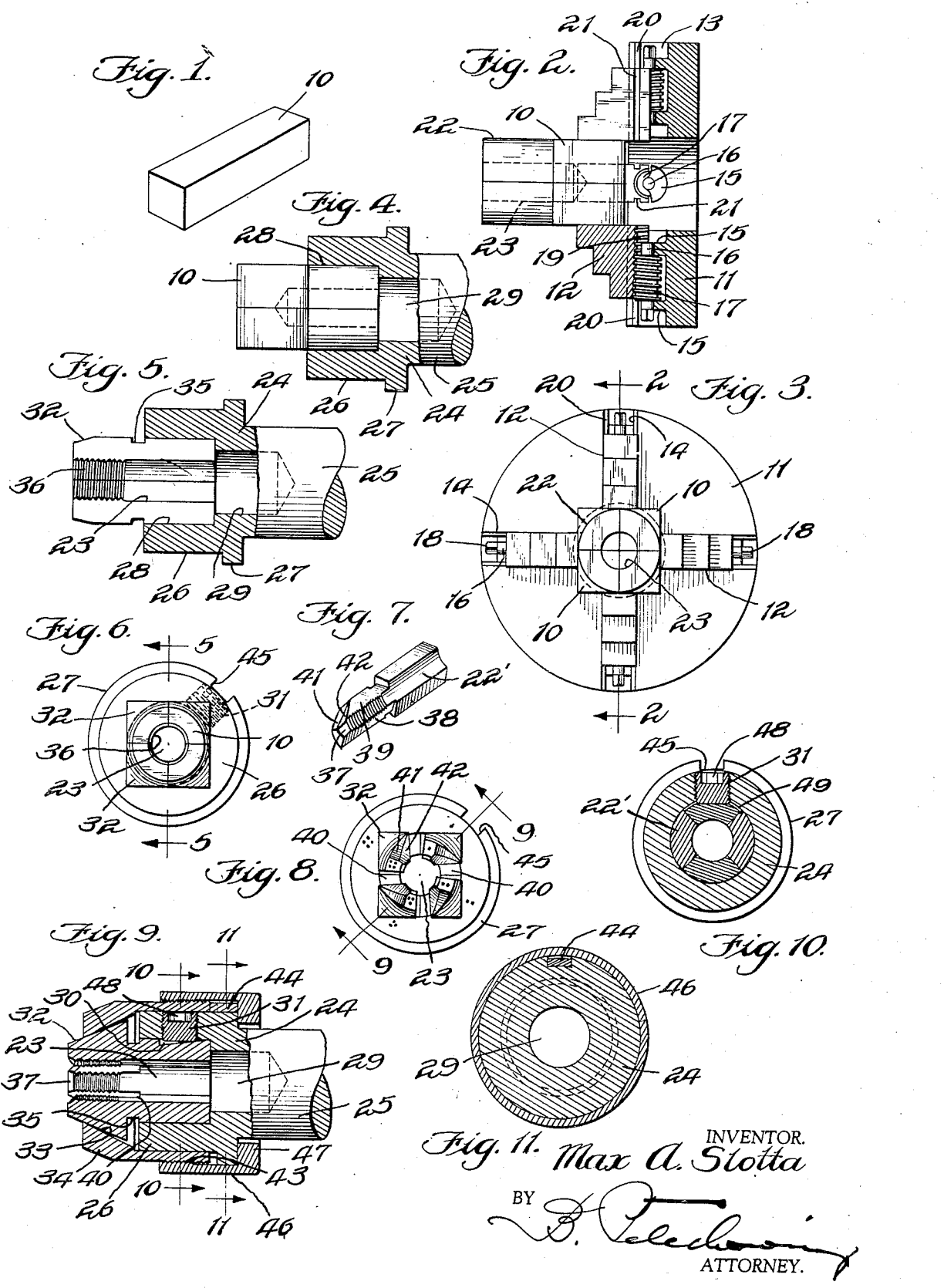
INVENTOR.
Max A. Slotta
BY
ATTORNEY.

Patented Nov. 30, 1937

2,100,724

UNITED STATES PATENT OFFICE 2,100,724

SCREW THREADING DIE

Max A. Slotta, Chicago, Ill.

Application June 6, 1936, Serial No. 83,849

1 Claim. (Cl. 10—111)

The present invention relates to screw threading dies and method of making the same, and the principal object of the invention is to provide a simple and inexpensive screw threading die whereby screw threads may be made accurately and economically and which may be subject to better methods of machining, adjusting and die holding.

A further object of the present invention is the provision of a die which would include a plurality of sections or chasers, which may be held in an operative position within a suitable die holder, and which may be removed therefrom for the purpose of re-grinding the chamfer and the cutting edges thereon, and in which one or more sections may be replaced without misalignment of the sections and without disturbing their relative positional relation or their relation with respect to the die holder.

A further object of the present invention is the provision of a screw threading die of the type which may be made in sections, held rigidly in a suitable holder, and which sections could become separated on removal therefrom from a holder in order to provide access to the inner operative faces of the sections in order that the same may be re-ground.

A still further object of the present invention is the provision of a screw threading die of the type made in sections, and which would answer the requirement of bringing about a close tolerance in the screw threads.

It is a known fact that in solid screw threading dies, which are intended to operate on a reduced portion of a rod for the purpose of threading the same, a die hitting a shoulder on the rod oftentimes breaks off the reduced end of the rod. When this happens in many cases the die is discarded and thrown away for the reason that the broken off portion of the rod cannot be easily removed from the die. Therefore, a still further object of the present invention is the provision of a die comprising a plurality of sections which could be easily removed from a die holder and whereby said sections could be easily separated in order to remove the broken off piece.

It is a known fact that self-opening chaser dies cannot be successfully used on screws in which only one or two threads are required. Hence, a further object of the present invention is the provision of a die of the type described which may be used for making the least number of threads required.

It is also a known fact that solid, pronged dies of small diameter are very difficult to regrind at the throat and at the cutting edge thereof, to make the same suitable for various types of metal. Therefore, a still further object of the present invention is the provision of a die made in sections which could be separated on removal therefrom from their operative position within a die holder, for the purpose of re-grinding the throat and the cutting edges thereof.

A still further object of the present invention is the provision of a screw threading die including a plurality of sections or chasers and which may be made by suitable method whereby the sections when in an operative position in a suitable fixture or die holder may remain in perfect alignment and whereby they may be interchangeable with respect to the die holders.

A still further object of the present invention is the provision of a method whereby a screw threading die made of a plurality of sections may be made and whereby a die made by the method herein disclosed may be interchangeably used with various holders of the same design.

A still further object of the present invention is the provision of a die holder which may be simple in construction and which may be provided with suitable means to press upon the operative end of the die so as to vary the diameter of the operative or working end of the die.

With the above general objects in view and others that will appear as the invention is better understood, the same consists in the novel construction, combination and arrangement of parts hereinafter more fully described, illustrated in the accompanying drawing and pointed out in the appended claim.

In the drawing forming a part of this application, and in which like designating characters refer to corresponding parts throughout the several views;

Fig. 1 is an enlarged perspective view of a block from which one section or chaser of a screw threading die is made;

Fig. 2 is a longitudinal view, partly in section and partly in elevation, of a chuck, illustrating one of the initial steps in the method of making a sectional threading die, the view being taken on line 2—2 of Fig. 3;

Fig. 3 is a top-plan view of the chuck with sections in position, illustrating one of the initial steps in the method of making the sectional die;

Fig. 4 is a longitudinal view, partly in section, of the die holder with sections in position therein, illustrating a further step in the method of making sectional screw threading die;

Fig. 5 is a longitudinal cross-section view, partly in elevation, of the die holder showing a further step of making sectional die, the view having been taken on line 5—5 of Fig. 6;

Fig. 6 is the end elevational view of the die holder with die sections partly completed, in position therein;

Fig. 7 is a perspective view of one completed and finished section of the die;

Fig. 8 is the end elevational view of the die holder together with sections, when in a completed form, in position therewithin;

Fig. 9 is a cross-sectional view of the completed die in an operative position within a holder, the view having been taken on line 9—9 of Fig. 8;

Fig. 10 is a transverse cross-sectional view on line 10—10 of Fig. 9; and

Fig. 11 is a cross-sectional view on line 11—11 of Fig. 9.

Referring in detail to the present drawing, the die illustrated therein is intended to be made in four sections out of four identically formed blocks such as block 10 shown on Fig. 1. The block shown is of an oblong formation, substantially square on cross-section. Instead of using four of such blocks, four long bars may be employed and the blocks of suitable length may be cut off therefrom.

Four blocks, such as block 10, usually made of carbon steel or high speed steel, are arranged in longitudinal square formation and thereupon are placed in a holder or a chuck such as is illustrated on Figs. 2 and 3. Said chuck includes base 11 and four gripping jaws 12 arranged in a crosswise radial formation as is clearly seen on Fig. 3. Made in said base 11 are radial recesses 13 with openings 14 through which said jaws 12 upwardly project and within which they are adapted to make longitudinal sliding movement to or away from the center of the chuck. A pair of bearings 15 integrally formed with and upwardly projecting from the adjacent body portion of base 11 are supporting shafts 16 carrying worm gear 17 which remains interposed between said bearings 15. The outer ends of said shafts 16 are squared as at 18 for adapting the same to be engaged by a suitable tool for revolving worm gear 17.

Said worm gear 17 meshes and engages rounded and threaded bottom 19 of said jaws 12. The edges adjacent openings 14 are provided with rails 20 fitting within grooves 21 made at the adjacent portions of jaws 12. Thus when worm gears 17 are rotated into one or opposite direction, jaw 12 is shifted to or away from the center of base 11 for the purpose of clamping the object worked upon.

Instead of a chuck, such as shown, a square collet in a turret in a lathe may be used and all the work may be performed thereby. A special square collet will clamp the four long bars automatically at one time.

As mentioned, four blocks 10 are longitudinally arranged in a square formation and thereupon the same are placed within the chuck which will be generally referred to as such by numeral 11. Jaws 12 are shifted to hold said four blocks 10 in position, as is clearly seen on Figs. 2 and 3, and while in that position the outer end of said four blocks 10 is rounded as at 22 so that said end may be cylindrical in formation. Thereupon, centrally of said four blocks 10, bore 23 is made which extends substantially beyond the center of said four blocks 10, as is clearly seen on Fig. 2. It is observed, however, that the ends of said four blocks 10 while worked upon while in said chuck 11 are straight and correspondingly even so that the same remain in perpendicular relation with the longitudinal axis of said blocks 10.

Said cylindrical end 22 of the four blocks 10 while in an arranged formation hereinabove described, will become an inner end while the four sections of the die undergo further processes, which will be presently described, or while said sections or chasers of the die are in an operative position within a die holder which will be later described.

In Figs. 4, 5 and 6, the die holder, which will be later described, and which is employed as a holder within which the die sections or chasers are held in position during the process of making the same, in all details and particulars as to construction, dimensions, etc., corresponds to the die holder shown on Figs. 8, 9, 10 and 11, which latter die holder is employed for holding the die sections or chasers in position during the operation of the die while working with the same. For this reason said die holder and all parts thereof in all of said figures will be designated by corresponding numerals.

Referring to Fig. 4, which illustrates the next step in the process of making the sectional dies, said four blocks 10 when finished to the extent shown on Figs. 2 and 3 are then placed, by their cylindrical end 22 into the holder generally indicated by 24, which includes cylindrical shank 25, of any dimensions or designs, and whereby said die holder is held in position within any suitable machine for rotating said holder with the die sections when the same are undergoing further processing or while the same are in a finished condition and are employed in thread making operation as finished article. Said die holder further includes a cylindrical head 26, provided at the inner end with an integrally formed, annular shoulder 27. A cylindrical socket 28 is made in said head, which socket communicates with a cylindrical bore 29, made partly in said head 26 and which partly extends into the body of shank 25. Both said socket 28 and said bore 29 are concentrically arranged with respect to both said head 26 and shank 25.

The next step of the production of the screw threading die herein disclosed consists of placing the inner cylindrical end 22 of said blocks 10 into socket 28 without, however, disturbing their original relative position and relation when taken out from chuck 11. First, however, on the outer peripheral face of one of said blocks 10 a notch 30, such as is shown on Fig. 9, is made to provide a tapered flat surface of small area upon the peripheral side of that section so that when the inner cylindrical end 22 of all of said blocks 10 is placed within socket 28 of the die holder 24 as shown on Fig. 4, in order that said blocks 10 may undergo a further step of the process of making of the die sections, a screw such as screw 31 may be driven through the peripheral side of head 26 and engage said notch 30 at one of the outer peripheral sides of one of the blocks 10, for the purpose of rigidly holding said blocks 10 within the holder and against any rotary or longitudinal movement therewithin independently of the holder while the outer end of said blocks 10 undergoes a further process presently described.

When said blocks 10 are in a position within die holder 24 hereinabove described, a taper or bevel 32 is made at the edge of the outer end of all of said blocks 10 while the same are in an arranged formation and held within said holder 26. This taper 32 is for the purpose of having said tapered edge engaged by the constricted tapering inner face 33 of cap 34 in order that the outer end of the incompleted die sections may be held firmly in position while said blocks 10 undergo a further step of the process. Thereupon annular groove 35 is made in said blocks 10 and said groove is made at a point of said blocks 10 which is nearest to the outer edge of the head 26 of the die holder 24, as is clearly seen on Fig. 5.

Said groove 35 is for the purpose of imparting to the outer ends of the completed die sections or chasers a degree of resiliency and springy qualities so that when the chasers are fully completed and are used as a tool to make threads, that by means of cap 34 and by virtue of its constricted and inwardly tapered face 33 while engaging bevel 32, the outer operative ends or prongs of all of the chasers may be moved or bent radially inwardly for regulating the active diameter of a thread.

Referring again to Figs. 4, 5 and 6, and assuming that said bevel 32 and groove 35 have already been made, cap 34 is applied to assume a position with respect to the four chasers while in that incompleted state to correspond to its position with respect to the completed threading die illustrated on Fig. 9. Said cap 34 when blocks 10 undergo a further process, holds the outer ends of said blocks 10 against any movement or distortion thereof with respect to the holder 24 while the further steps in the process are applied thereto. These steps include drilling, tap-hobbing and chamfering. The drilling step in the process is to make a cylindrical bore in the outer ends of blocks 10, of a diameter corresponding substantially to the diameter of the apexes of the teeth in the thread later provided in said bore by tap-hob. Thus, as a result of tap-hobbing an inner thread 36 will be provided in the outer ends of blocks 10, and on the periphery of the bore made by the drilling, which bore communicates with bore 23.

The next step is chamfering which amounts to bevelling off the outermost threads 36 and which may include destruction of one of the outermost teeth of the thread 36 or a peripheral reduction of one or more of the outermost teeth of said thread so as to provide an outwardly flaring out mouth of the die, which in the art of screw threading die making is known as a "throat" of the die, which facilitates the reception of the end of a rod within the outermost end of the die at the commencement of thread making operation thereon. In the completed die section or chaser shown on Fig. 7 the chamfer or throat of the die section is indicated by 37.

When drilling, tap-hobbing and chamfering have been completed cap 34 is thereupon removed from holder 24. The screw 31 is loosened and die sections are removed from said holder 24 and thereupon each of said sections, as a further step in the process of making the die, is machined at both edges of its operative prong or working end, as at 38 and 39, for providing, between said ends longitudinal slots 40 when all the sections are again assembled in their operative position, for providing proper chip and cutting clearance. To this end the outermost end, and laterally thereof is also machined to provide a pair of bevels 41 and 42 angularly disposed with relation to each other. These slots 40 and tapers 41 and 42 may be found also in solid screw threading dies.

As a final step of making the die sections the same are heat treated and tampered.

From the hereinabove description it will be seen that the inner end of the completed die sections, best shown on Fig. 7, is arcuate on transverse cross-section, as at 22' so that when all of said sections are re-assembled the inner ends of each of them will form a cylinder, as is seen on Figs. 2, 4 and 5, with notch 30 on one of said sections.

Referring now more particularly to Figs. 9, 10 and 11 which illustrate the completed die sections as being ready for use and in an operative position within a holder, the mechanism for adjusting the diameter of the die section prongs includes said cap 34. The same being outwardly threaded at its inner end as at 43 and has at that end an integrally formed and outwardly projecting lug 44 which is adapted to enter into a corresponding slot 45 made in annular shoulder 27.

The threaded end of said cap 34 is adapted to be engaged by an inwardly threaded sleeve 46, having an inwardly extending annular flange 47, which, in the operative position of said sleeve 46 bears against the resulting shoulder at head 26 and annular shoulder 27, said sleeve with its flange 47 being insertable upon the head of the holder over shank 25. Said sleeve 46, if desired, may be provided with tool engaging recesses, or it may be knurled to facilitate its rotation.

Screw 31 at its outer end is provided with a polygonal socket 48 to receive a correspondingly shaped end of a tool for operating said screw 31. It is observed that when said screw is operated fully to bear against the adjacent end 22' of a given die section or chaser, its outer end will remain flush with the periphery of head 26 so that said cap 34 may enter upon said head 26 without hindrance and interference from said screw 31. When the holder is in operation or rotation, screw 31 will be prevented from making any creeping movement in either direction since it will bear against both the adjacent end 22' of the die section by one of its ends and against the adjacent periphery of cap 34 by the other end. When cap 34 is placed over the working end of the threading die with its constricted outer mouth, including taper 33 bearing against the adjacent taper 32 of the die sections and its peripheral portion remains over the periphery of head 26, lug 44 will remain within slot 45. Thereupon sleeve 46 is rotated for threadedly engaging the adjacent end of said cap 34 for the purpose of causing the outer constricted end of cap 34 to exert pressure upon die sections for the purpose of moving or slightly springing them towards the center in order that the diameter of the thread to be made may be regulated. Annular groove 35 facilitates the bending movement of the operative ends or prongs of the threading die towards the center when under the pressure of the constricted tapered end of cap 34. Lug 44, remaining within slot 45, will prevent any rotary movement of cap 34, either during the adjustment of said cap upon head 26 by sleeve 46, or during the operation of the die.

The purpose of bores 23 and 29 is to permit entrance thereto of the already completed threaded portion of the screw during the process of making thereof and as the threading work progresses.

Chips and shavings during threading operation will fall through slots 40, and any insignificant portions thereof finding their way within bore 29 may be removed therefrom upon completion of the particular screw work. If desired transverse bores or openings made in shank 25 may be provided to communicate with bore 29, and similar transverse bores may be made in cap 34 to be disposed oppositely to slots 40 may likewise be made, all for the purpose of permitting chips and shavings to fall out during the screw threading operation.

It is further observed that during some of the steps in the process of making the sectional die herein described, particularly in the steps illustrated on Figs. 4 and 5, screw 31 pressing against one of the sections will cause the oscillating movement of the other sections so that there is a resulting perfect alignment and interchangeability of location of all of the sections, and this condition is preserved when said sections are removed from the holder in which they have undergone the finishing process and are placed within a holder of similar design and construction held by it while the completed die is used for threading work.

The bearing of screw 31 against one of the threading die sections, both during the construction of the die sections by the process herein described as well as in the ultimate use of the die, causes said positional relation of all of the sections with respect to each other as well as with respect to the holder whether the one in which the dies have been undergoing the process of making the same or the holder in which said sections are ultimately held when in operation and to emphasize this point there is shown on Fig. 10 an exaggerated space 49 which results between the adjacent periphery of head 26 and the inner end 22' of the adjacent section against which screw 31 bears.

It is further observed that it is not of great importance that the bore 23 or the bore defined by the screw cutting teeth upon the working ends of the die sections be concentrically located with relation to either blocks 10 while the same undergo the process of making die sections or when the sections have been completed. However, it is of utmost importance that said bores, and particularly the bore defined by the screw cutting teeth of the working ends of the die sections be concentrically located with respect to holder 24, and since two holders, one upon which the dies have undergone process of making as well as the other holder used in operation, are of identical construction, any possibility that the die sections may not be concentrically located insofar as their operative ends are concerned with respect to the holder, is for all practical purposes eliminated.

In order to preserve perfect positional relative arrangement of the die sections with respect to each other as well as the positional relation of all of the die sections with respect to the die holder with which said die sections are intended to be used in operation, suitable indicia may be employed upon the holder as well as upon the die sections used therewith as to in what particular location the several die sections should be placed within the holder. One of such means for designating the relative position of the several die sections with respect to the holder, and which, by the way, is the position originally assumed by said die sections while in the holder upon which the die sections have undergone the process of making, is suggested on Fig. 8 by dots from one to four, both inclusive, and similar number of dots employed on the several die sections. These dots may be punched in the metal both in the holder and in the sections to mean, for illustration, that section marked with three dots should be placed in the holder adjacent the place indicated by same number of dots.

Obviously it is not my desire to limit myself to any particular number of die sections. Any number of sections from two up may be used and my method followed in making them. If however three or more than four sections are to be made, in that event blocks 10 instead of being squared should have substantially triangular form on transverse cross-section, which when longitudinally arranged will form a polygonal block, which may fit into any suitable chuck for holding all of the said blocks in proper relative position while worked upon. All other steps in the process herein described as well as in the method employed in using the die sections when made will be substantially the same as described in connection with the four blocks and the resulting four die sections.

While there is described herein a preferred embodiment of the present invention, it is nevertheless to be understood that minor changes may be made therein without departing from the spirit and scope of the invention as claimed.

What I claim as new is:

A threading die composed of a plurality of similar independent longitudinal sections, each section including an elongated segmento-cylindrical base member provided with a plane inner end and having a prong integrally connected to the outer end thereof by a reduced portion permitting lateral flexing of said prong relative to said base member, said sections being constructed and adapted to be grouped with their base members in contiguous relation to provide a cylindrical base having a plane inner end, the prongs of said sections being constructed so as to be spaced apart when the sections are so grouped and being provided with a cutting thread whose axis is coincident with the axis of said base.

MAX A. SLOTTA.